United States Patent
Volchek et al.

(10) Patent No.: US 12,005,502 B2
(45) Date of Patent: Jun. 11, 2024

(54) BRANCHING SUPPORT FOR METALS THAT MINIMIZES MATERIAL USAGE

(71) Applicant: 3D Systems, Inc., Rock Hill, SC (US)

(72) Inventors: Kirill Volchek, Kiriat Ono (IL); Vladimir Budovsky, Kiryat Ono (IL)

(73) Assignee: 3D SYSTEMS, INC., Rock Hill, SC (US)

( * ) Notice: Subject to any disclaimer, the term of this patent is extended or adjusted under 35 U.S.C. 154(b) by 16 days.

(21) Appl. No.: 17/546,239

(22) Filed: Dec. 9, 2021

(65) Prior Publication Data
US 2022/0203453 A1 Jun. 30, 2022

Related U.S. Application Data

(60) Provisional application No. 63/131,474, filed on Dec. 29, 2020.

(51) Int. Cl.
*B22F 10/40* (2021.01)
*B22F 10/28* (2021.01)
(Continued)

(52) U.S. Cl.
CPC .............. *B22F 10/40* (2021.01); *B22F 10/28* (2021.01); *B22F 10/30* (2021.01); *B33Y 10/00* (2014.12); *B33Y 30/00* (2014.12); *B33Y 50/02* (2014.12)

(58) Field of Classification Search
CPC .......... B22F 10/00; B22F 10/20; B22F 10/28; B22F 10/40; B22F 10/43; B22F 10/47; B33Y 10/00
See application file for complete search history.

(56) References Cited

U.S. PATENT DOCUMENTS

| 8,663,539 B1 * | 3/2014 | Kolodziejska | B29C 64/129 264/401 |
| 9,688,024 B2 * | 6/2017 | Stava | B22F 10/50 |

(Continued)

FOREIGN PATENT DOCUMENTS

| CN | 106853527 A | * 6/2017 |
| EP | 2910362 A1 | 8/2015 |

(Continued)

OTHER PUBLICATIONS

PCT International Search Report for PCT Application No. PCT/US2021/062541, mailed Apr. 12, 2022 (5 pages).

(Continued)

*Primary Examiner* — Keith Walker
*Assistant Examiner* — Ryan L Heckman

(57) ABSTRACT

A system for manufacturing a three-dimensional (3D) article includes a controller. The controller is configured to (A) receive a solid model defining the 3D article having an unsupported (downward facing) surface and (B) define a support structure for the unsupported surface. The support structure includes (1) a lower support beam, (2) a node body, and (3) at least three branches. The node body is defined at an upper end of the lower support beam. The node body has an upper surface that is generally in facing relation with the unsupported surface. The at least three branches extend with a diverging geometry away from the upper surface of the node body and to the unsupported surface. The branches are individually defined by a vertical sequence of contour scan patterns.

14 Claims, 6 Drawing Sheets

(51) Int. Cl.
  *B22F 10/30* (2021.01)
  *B33Y 10/00* (2015.01)
  *B33Y 30/00* (2015.01)
  *B33Y 50/02* (2015.01)

(56) References Cited

U.S. PATENT DOCUMENTS

| | | | |
|---|---|---|---|
| 10,105,897 | B2 | 10/2018 | Weitzel et al. |
| 10,384,263 | B2 * | 8/2019 | Craeghs ................ B29C 64/153 |
| 10,576,725 | B2 * | 3/2020 | Seidler .................. B33Y 10/00 |
| 2016/0136896 | A1 * | 5/2016 | Wighton ................ B33Y 50/00 |
| | | | 700/120 |
| 2017/0014904 | A1 * | 1/2017 | Brown ................. B22F 10/366 |
| 2017/0066083 | A1 * | 3/2017 | Shioya ................... B22F 10/47 |
| 2017/0232511 | A1 * | 8/2017 | Fieldman .............. B33Y 10/00 |
| | | | 419/7 |
| 2018/0215601 | A1 * | 8/2018 | Shuck .................... B22F 10/25 |
| 2019/0186669 | A1 * | 6/2019 | Lin ......................... F16L 9/006 |
| 2019/0232372 | A1 * | 8/2019 | Schmithuesen ......... B22F 10/60 |
| 2020/0206817 | A1 | 7/2020 | Nachiketa et al. |
| 2022/0168963 | A1 * | 6/2022 | Binek .................... B33Y 50/00 |

FOREIGN PATENT DOCUMENTS

| | | | | |
|---|---|---|---|---|
| WO | WO1989010254 | A1 * | 11/1989 | ............. G06T 17/20 |
| WO | 2012131481 | A1 | 10/2012 | |
| WO | WO-2020088967 | A1 * | 5/2020 | |

OTHER PUBLICATIONS

PCT Written Opinion for PCT Application No. PCT/US2021/062541, mailed Apr. 12, 2022 (6 pages).

* cited by examiner

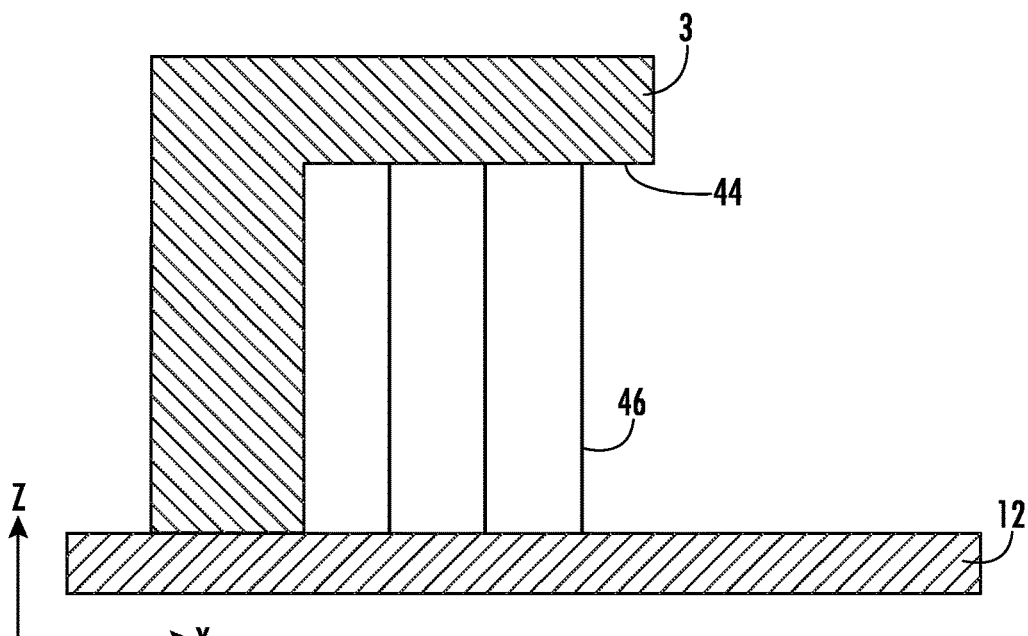
FIG. 3
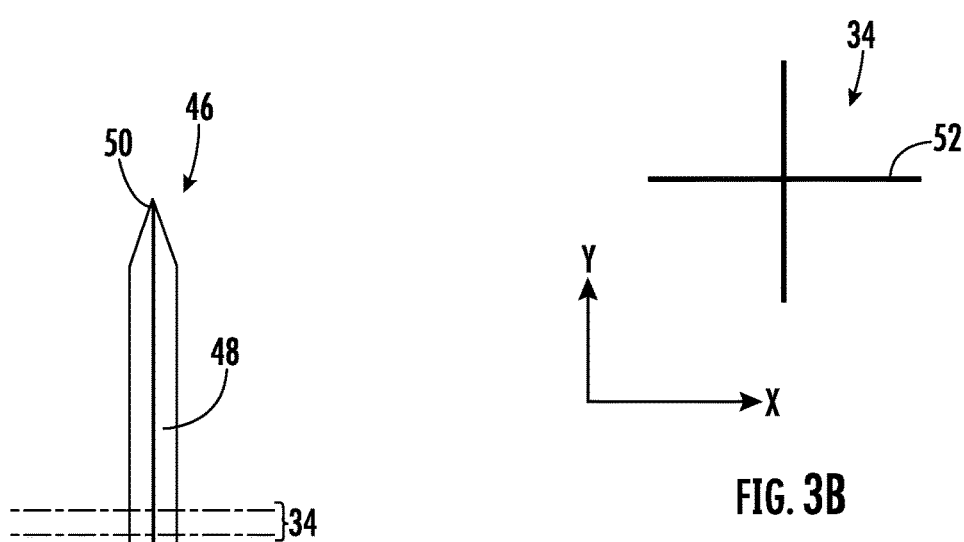
FIG. 3B
FIG. 3A
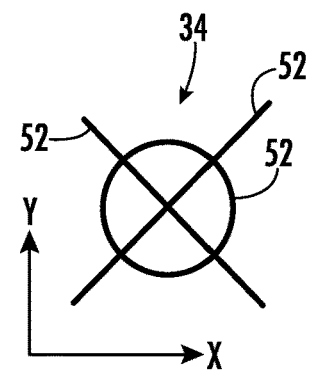
FIG. 3C

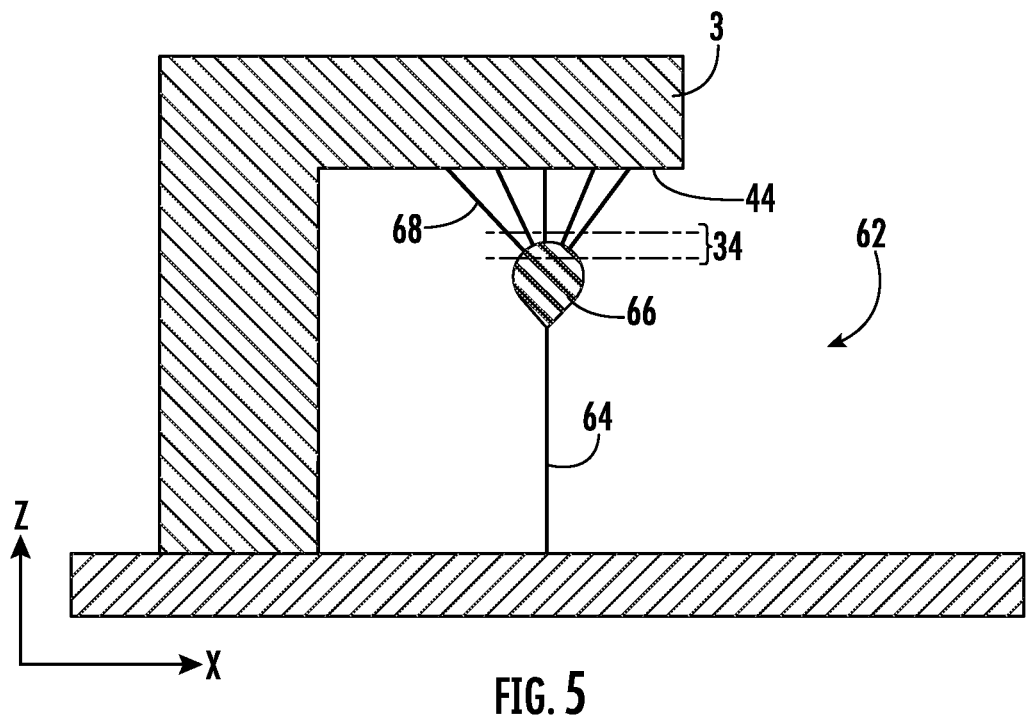
FIG. 5
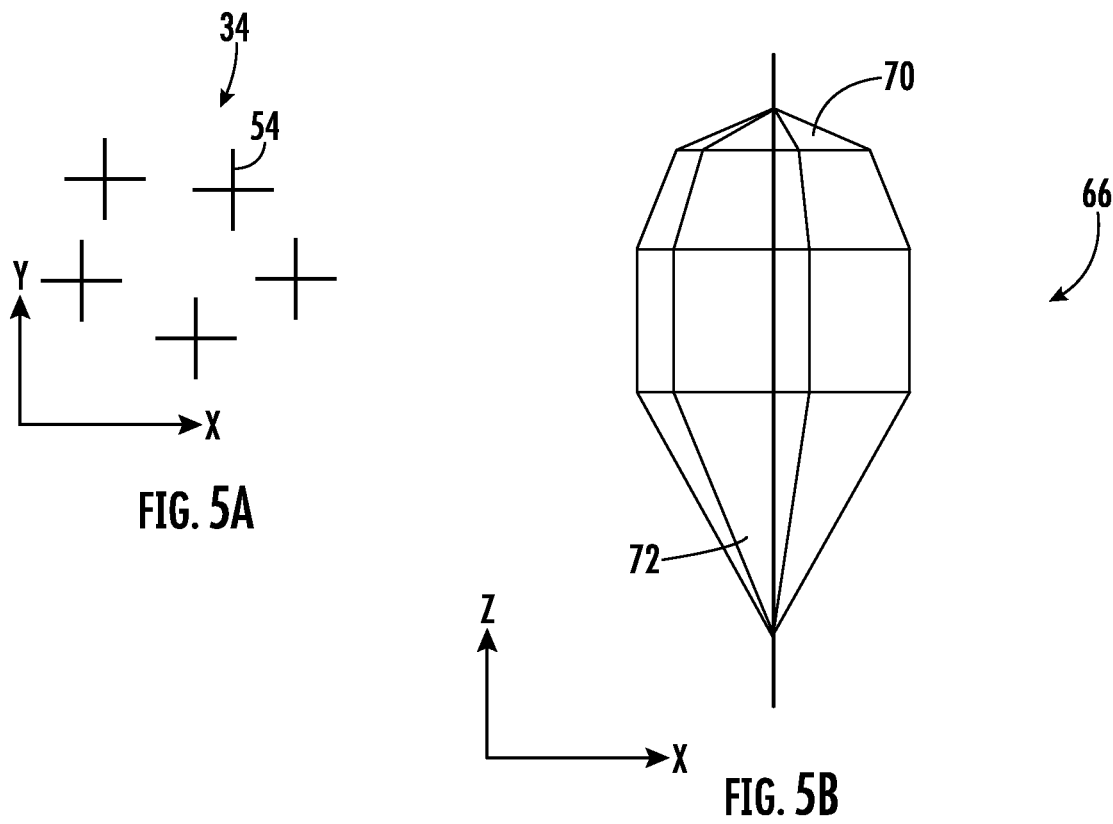
FIG. 5A
FIG. 5B

BRANCHING SUPPORT FOR METALS THAT MINIMIZES MATERIAL USAGE

CROSS-REFERENCE TO RELATED APPLICATIONS

This non-provisional patent application claims priority to U.S. Provisional Application Ser. No. 63/131,474, Entitled "Branching Support for Metals That Minimizes Material Usage" by Kirill Volchek et al., filed on Dec. 29, 2020, incorporated herein by reference under the benefit of U.S.C. 119(e).

FIELD OF THE INVENTION

The present disclosure concerns an apparatus and method for a layer-by-layer fabrication of three dimensional (3D) articles utilizing metal powder materials. More particularly, the present disclosure concerns a way of very efficiently and reliability forming support structures for unsupported surfaces.

BACKGROUND

Three dimensional (3D) printing systems are in rapidly increasing use for purposes such as prototyping and manufacturing. One type of 3D printing system utilizes a layer-by-layer process to form a three dimensional article of manufacture from metal powders. Each layer of metal powder is selectively fused using a high energy beam such as a laser, electron, or particle beam. Higher productivity printers can utilize multiple energy beams. One challenge with these systems is to provide support for overhanging or unsupported surfaces in an efficient manner and without defects. Related defects can include dross of melting metal into underlaying powder and deformation caused by residual stresses.

BRIEF DESCRIPTION OF THE FIGURES

FIG. 3 is a side schematic view depicting a 3D article and vertical supports on a build plate.

FIG. 3A is a side view of a single vertical support. This figure can also represent an individual branch support from FIG. 5. The support is formed from an intersection of curved and/or planar elongate sheets. It has a tapered or pointed end for coupling to an unsupported surface.

FIG. 3B is a first embodiment of a horizontal slice taken from FIG. 3A. The support in FIG. 3A is formed by a vertical sequence of horizontal slices. For one horizontal slice, a plurality of intersecting contours are formed. The contours can be linear or curved. In the illustrated embodiment of FIG. 3B, the intersecting contours includes two intersecting linear segments that form a cross-shape.

FIG. 3C is a second embodiment of a horizontal slice taken from FIG. 3A. For this horizontal slice, three intersecting contours are formed. The intersecting contours includes the two intersecting segments that form a cross-shape from FIG. 3B. Additionally, the contours includes a circular contour that intersects the two segments at four points.

FIG. 5 is a side view depicting a 3D article and a support structure on a build plate.

FIG. 5A is a view of a horizontal slice taken from FIG. 5 that is proximate to an intersection of branches with a node body.

FIG. 5B is an isometric view of a node body.

SUMMARY

Figure 1:
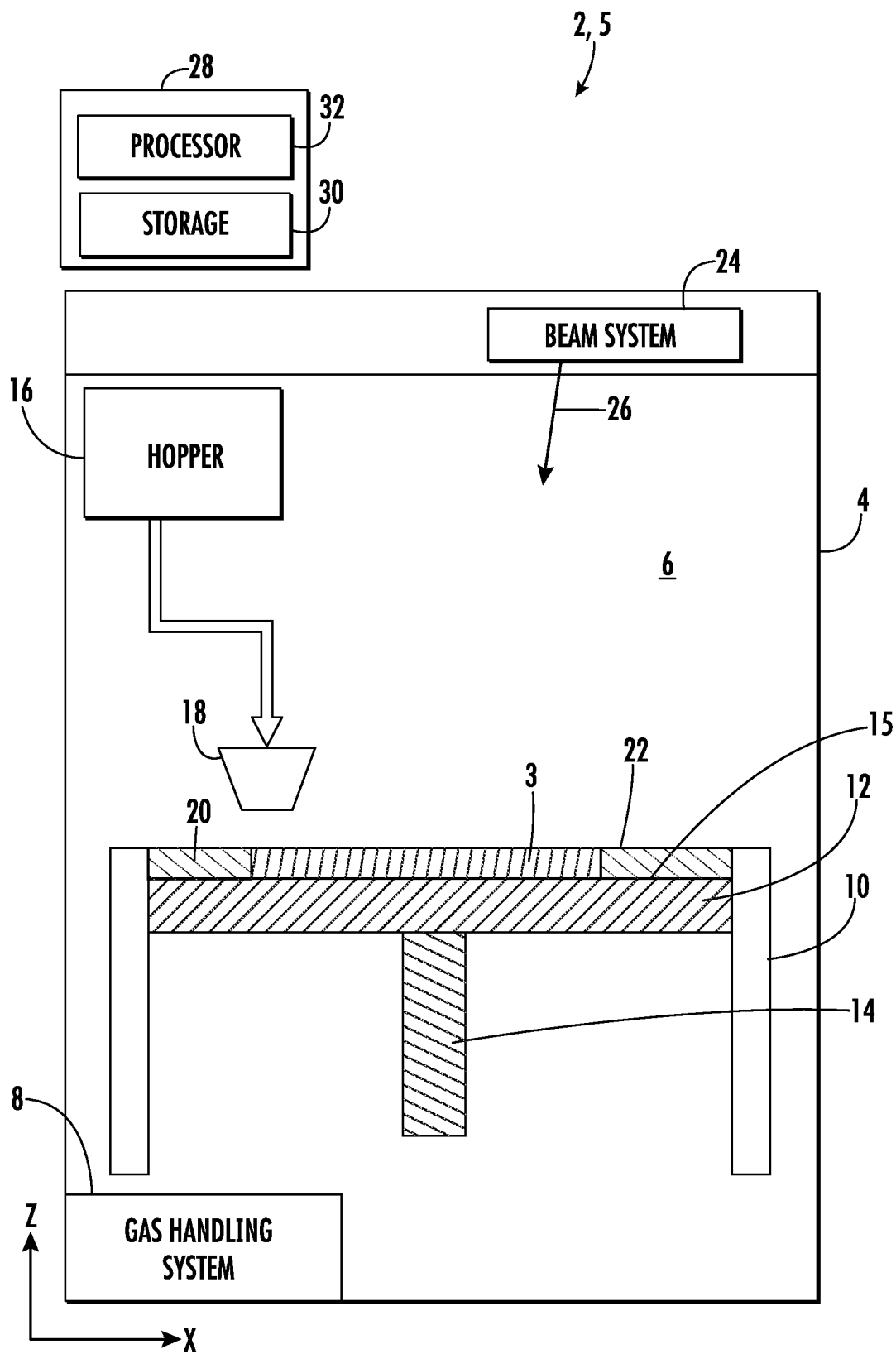
FIG. 1 is a schematic drawing of an embodiment of a three-dimensional (3D) printing system.

In an aspect of the disclosure, a system for manufacturing a three-dimensional (3D) article includes a controller. The controller is configured to (A) receive a solid model defining the 3D article having an unsupported (downward facing) surface and (B) define a support structure for the unsupported surface. The support structure includes (1) a lower support beam, (2) a node body, and (3) at least three branches. The node body is defined at an upper end of the lower support beam. The node body has an upper surface that is generally in facing relation with the unsupported surface. The at least three branches extend with a diverging geometry away from the upper surface of the node body and to the unsupported surface. The branches are individually defined by a vertical sequence of contour scan patterns. The lower support beam can extend upward from a build plate or from a surface of the 3D article. The support structure can include multiple support structures for supporting one or more unsupported surfaces. The lower support beam can include more than one lower support beam.

The node body prevents overheating of a convergence zone of the branches. The convergence zone is defined as an approximate intersection of a downward projection of the branches. The node body reduces a temperature at the convergence zone in two ways: (1) An intersection of the branches and the upper surface of the node body are spatially separated across the upper surface. (2) The node body acts as a heat sink to conduct heat away from the branches.

In one implementation, the node body is a solid node body defined by a vertical sequence of node slices. The node slices are individually area fills. An area fill is an area over which a layer of powder is completely solidified. The area fill can be formed by "bidirectional" scans and short incremental jumps. Adjacent bidirectional scans have opposing scan directions. A jump is a scan with laser power off. The jump distance defines an offset from one scan to the next to assure complete solidification over the area fill but to avoid excessive overlap. During a scan, the laser power is on with a path of melting or fusing metal. During a jump, the laser power is off with no melting or fusing metal. Another area fill technique utilizes adjacent scans that are unidirectional but also separated by jumps. The area fill can be enclosed within an outer boundary contour. The contour can be formed by one contour scan or a plurality of offset contour scans. Yet another area fill technique divides the area fill into zones such as triangles, hexagons, rectangles, squares, irregular shapes, or other shapes.

In another implementation, the node body has a converging lower end at an opposing or opposite end of the node body relative to the upper surface of the node body. The converging lower end tapers down to the upper end of the lower support beam. The converging lower end assures proper support of the node body by the lower support beam.

In a yet another implementation, an intersection between the node body and the branches defines a plurality of contour scan patterns. The contour scan patterns are spatially separated to prevent overheating caused by overlapping contour scan patterns. The node body also acts as a heat sink to conduct heat away from the contour segments to further prevent overheating.

The contour scan patterns individually include a plurality of intersecting contour scans. The contour scans are individually one of a linear segment, a curved segment, and a closed curve. The contour scan pattern can include a cross-shaped arrangement of two linear scans. The contour scan pattern can include a cross-shaped arrangement of two linear scans and a circular scan that intersects the cross-shaped arrangement at four points.

In a further implementation, the system includes a 3D print engine. The 3D print engine includes a gas handling system, a build plate, a movement mechanism coupled to the build plate, a powder coater, and a beam system. The controller is configured to operate the 3D print engine to fabricate the 3D article and support structure. In referring to the controller, it is to be understood that the controller can be two different physical controllers. One can be used to receive the solid model and define the 3D article and support structure. Another can be used to operate the 3D print engine. Alternatively, the controller can be one integrated physical controller. Yet alternatively the controller can be any number of physical controllers that can be internal and/or external to the print engine. The controller can include one or more of microcontrollers, networked servers, and client devices.

In a second aspect of the disclosure, a method for manufacturing a 3D article from metal powder includes (A) receiving a solid model defining a 3D article having an unsupported (downward facing) surface and (B) defining a support structure for the unsupported surface. The support structure includes (1) a lower support beam, (2) a node body, and (3) at least three branches. The node body is defined at an upper end of the lower support beam. The node body has an upper surface that is generally in facing relation with the unsupported surface. The at least three branches extend with a diverging geometry away from the upper surface of the node body and to the unsupported surface. The branches are individually defined by a vertical sequence of contour scan patterns. The lower support beam can extend upward from a build plate or from a surface of the 3D article. The support structure can include multiple support structures for supporting one or more unsupported surfaces. The lower support beam can include more than one lower support beam.

In a third aspect of the disclosure, a non-transient information storage system (such as a non-volatile storage drive) stores software instructions. When executed by a processor the software instructions perform the following steps: (A) receive a solid model defining the 3D article having an unsupported (downward facing) surface and (B) define a support structure for the unsupported surface. The support structure includes (1) a lower support beam, (2) a node body, and (3) at least three branches. The node body is defined at an upper end of the lower support beam. The node body has an upper surface that is generally in facing relation with the unsupported surface. The at least three branches extend with a diverging geometry away from the upper surface of the node body and to the unsupported surface. The branches are individually defined by a vertical sequence of contour scan patterns. The lower support beam can extend upward from a build plate or from a surface of the 3D article. The support structure can include multiple support structures for supporting one or more unsupported surfaces. The lower support beam can include more than one lower support beam.

DETAILED DESCRIPTION OF THE PREFERRED EMBODIMENTS

FIG. 1 is a schematic diagram depicting an embodiment of a three-dimensional (3D) printing system 2 for manufacturing a three-dimensional (3D) article 3 from metal powder. In describing 3D printing system 2, mutually orthogonal axes X, Y and Z can be used. Axes X and Y are lateral axes that are generally horizontal. Axis Z is a vertical axis that is generally aligned with a gravitational reference. By "generally" it is intended to be so by design but may vary due to manufacturing tolerances or other sources of variation. The specific embodiments and applications thereof described above are for illustrative purposes only and do not preclude modifications and variations encompassed by the scope of the following claims.

Operating components of 3D printing system define a "print engine 5" and are generally within or proximate to an outer housing 4 that encloses an inner chamber 6. A gaseous atmosphere within the inner chamber 6 is provided and maintained by a gas handling system 8. Before operation, the gas handling system 8 evacuates air from the inner chamber 6 and then "backfills" the inner chamber 6 with a non-oxidizing gas such as nitrogen or argon.

Within chamber 6 is a build box 10. Build box 10 includes a build plate 12 coupled to movement mechanism 14. The movement mechanism 14 is configured to vertically position the build plate 12. In some embodiments, the movement mechanism 14 includes a motor and a gear train configured to impart vertical motion to raise and lower the build plate 12. Such movement mechanisms are generally known in the art. One example of such a movement mechanism is a motor driven lead screw mechanism. Another example is a rack and pinion mechanism. Build plate 12 has an upper surface 15.

A hopper 16 is coupled to a coater 18. The coater 18 receives metal powder from hopper 16 and is configured to deposit layers of metal powder 20 over the upper surface 15 of build plate 12. As each layer of metal powder 20 is dispensed, a "build plane" 22 is defined over an upper surface of the most recently dispensed layer of metal powder.

A beam system 24 is configured to generate and scan one or more energy beams 26 across the build plane 22 to fuse a just-dispensed layer of the metal powder 20. The energy beam 26 can be based upon one or more of a radiation beam, a particle beam, and an electron beam. In an illustrative embodiment, the energy beam 26 is a radiation beam 26 having an optical powder level of 500 watts or more or about 1000 watts (1 KW).

A controller 28 is electrically or wirelessly coupled to components of the 3D print engine 5 including to gas handling system 8, movement mechanism 14, hopper 16, coater 18, beam system 24, and to other components. Controller 28 can include a single controller module within 3D print engine 5 or it can include multiple controller modules that are internal and/or external to 3D print engine 5. Controller 28 can include one or more microcontrollers, networked servers, and client devices. A client device can include one or more of desktop computers, laptop computers, tablet computers, smartphones, and other fixed or mobile devices. As such, when the controller 28 is referred to it is to be understood that all such variations are possible.

Controller 28 includes a non-transient storage device 30 and a processor 32. The non-transient storage device 30 stores software instructions. When executed by the processor 32, the software instructions receive information from and control components of the 3D print engine 5. As such, the controller 28 is said to be configured to receive information from and control components of the 3D print engine 5. To manufacture the 3D article 3, the controller 28 is configured to: (1) operate the gas handling system to evacuate and backfill the chamber 6 with a non-oxidizing gas, (2) operate the movement mechanism 14 to position the build plate 12 for receiving a layer of metal powder 20, (3) operate the coater 18 to dispense a layer of metal powder 20 over the build plate 12, (4) operate the beam system 24 to selectively fuse the layer of metal powder 20, repeat steps (2)-(4) to finish fabricating the 3D article 3, and (5) operate the gas handling system 8 and other portions of the 3D printing system 2 to prepare for unloading the 3D article 3. In fabricating the 3D article 3, removable support structures can also be fabricated for supporting unsupported surfaces of the 3D article 3.

Figure 2A:
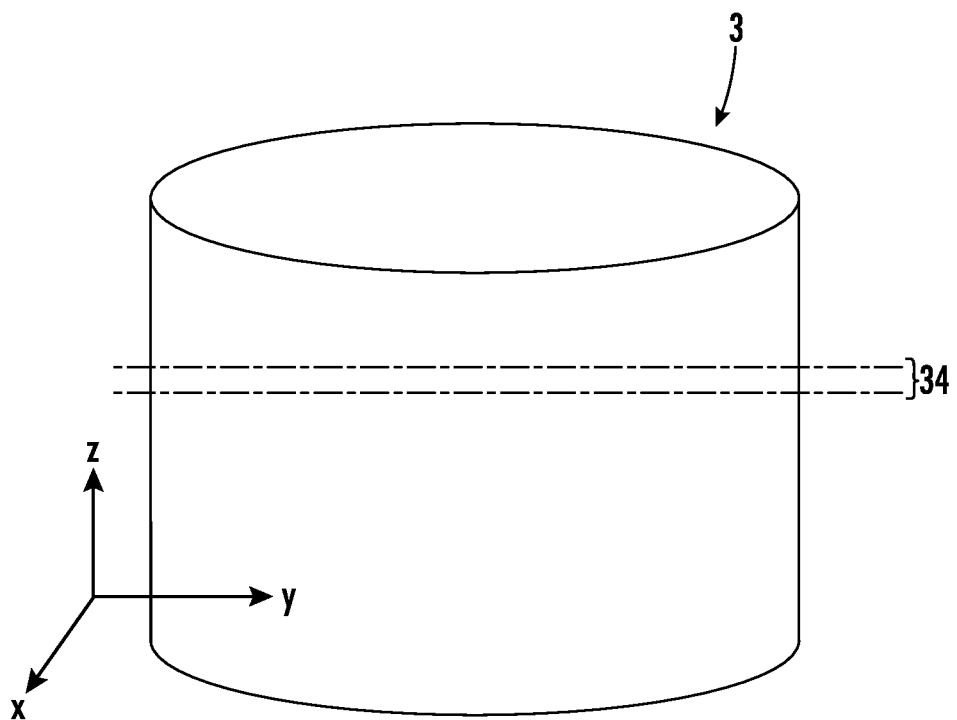
FIG. 2A is an isometric drawing of a 3D article having an oval cylinder shape.
Figure 2B:
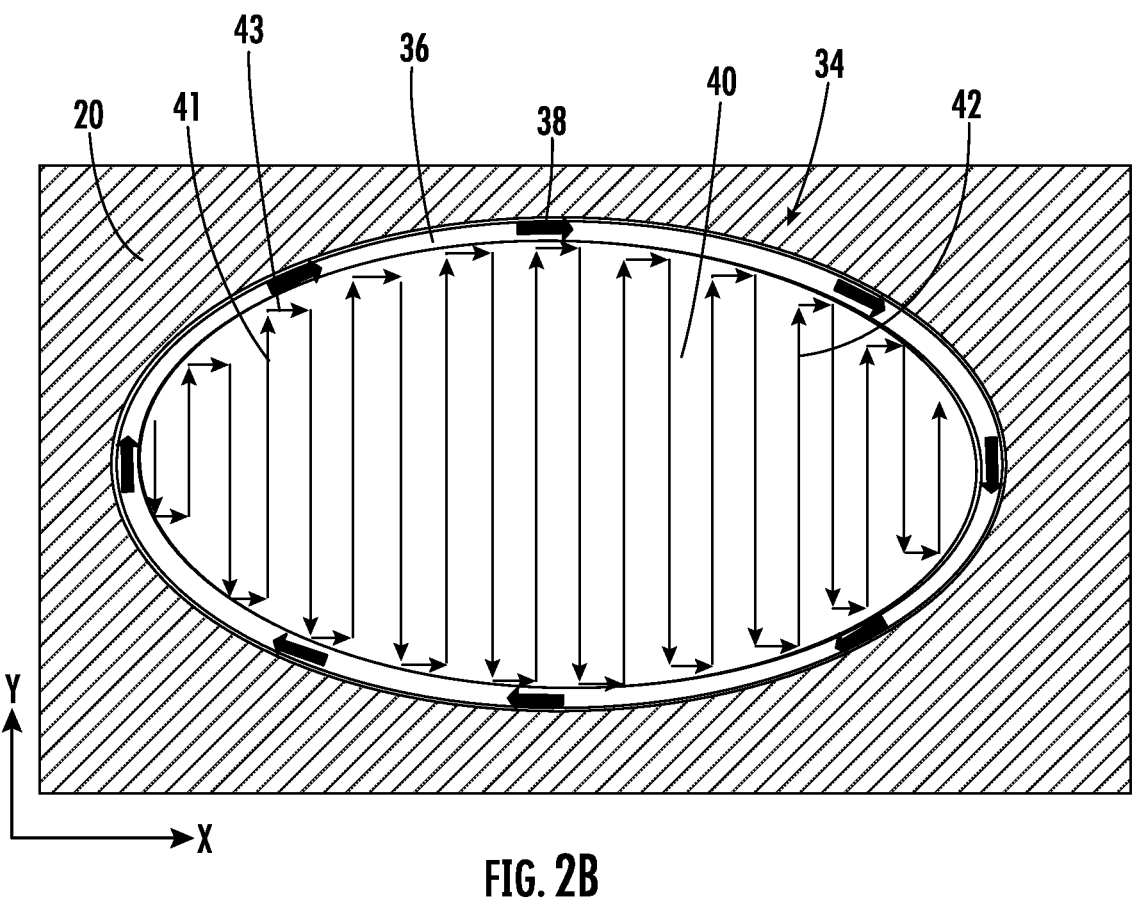
FIG. 2B is a schematic drawing of a horizontal slice taken from FIG. 2A.

FIGS. 2A and 2B will now be discussed in order to define and explain a difference between two modes of operating the beam system 24 including an area fill (hatching) mode for solidifying volumes of solid bodies and a contour mode for solidifying boundaries and sheet structures. The contour mode forms a contour 36. The contour 36 typically defines an outer or inner surface or boundary of the article 3. The area fill mode forms material within an outer contour 36 or between inner and outer contours 36.

FIG. 2A is an isometric drawing depicting a solid 3D article 3 with an oval cylinder shape. The cylinder axis is aligned with the vertical Z-axis and an oval cross-section is defined along the lateral X and Y axes. The 3D article 3 is formed with a vertical sequence of slices 34 one of which is indicated by two dashed lines in FIG. 2A.

FIG. 2B is a view in X and Y depicting the slice 34. An outer boundary or contour 36 of the slice 34 is formed by fusing along the contour 36. To fuse the contour 36, the beam 26 traces around the contour 36 in a direction indicated by arrows 38. In general, a contour 36 can be formed by retracing the contour 36 multiple times different offsets from a part boundary to increase a width of the contour 36. In one illustrative embodiment, the contour 36 is a "single width" contour 36 in which the contour 36 is only traced or scanned once. In other illustrative embodiments, the contour 36 is formed by tracing or scanning along the contour 36 two or more times.

The solid interior 40 of the slice 34 is formed by a back forth linear scanning (indicated by scan arrows 42) of the beam 26 within the contour or boundary 36. Back and forth area fill scanning with adjacent linear vectors can also be referred to as "hatching". The solid interior 40 can also be referred to as an area fill or "hatch pattern" 40. An area fill 40 is an area of the metal powder 20 that is completely solidified.

In the illustrated embodiment, the area fill 40 includes major scans 41 and incremental scans or jumps 43 between major scans. First, a major scan 41 (with laser on, fusing metal) is made in the +Y direction. Second, an incremental jump 43 (with laser off, not melting metal powder) is made in the +X direction. Third, a major scan 41 (with laser on, melting metal powder) is made in the −Y direction. Fourth, an incremental jump 43 is made in the +X direction. This scan method continues with adjacent major scans 41 having opposing or opposite directions separated by incremental jumps 43 having a fixed direction and magnitude. Adjacent scans 41 having opposed directions are referred to as "bidirectional scans" 41. A length of an incremental jump 43 is selected to assure complete fusion of powder 20 in the area fill 40 but to avoid too much overlapping scanning which would tend to overheat the metal. Other methods of area fill scanning are possible such as with incremental scans 43 with the laser on. While incremental jumps 43 are shown as being in the +X direction, it is to be understood that incremental jumps 43 can have both X and Y components.

While FIG. 2B illustrates major scans 41 along plus and minus Y, any set of opposing directions is possible for the major scans 41 including plus and minus X or opposing directions that are oblique to X and Y. When the major scans 41 are along plus and minus X, the incremental jumps 43 can be along +Y or −Y. When the major scans 41 are oblique, so can be the incremental scans. In the illustrative embodiment, the major scans 41 are orthogonal to the incremental jumps 43. In some embodiments, the major scans 41 may not be exactly orthogonal to the incremental jumps 43. Most generally, both major scans 41 and incremental scans can have components along X and/or Y.

In other embodiments, adjacent major scans 41 can be unidirectional (always in the same direction). Then the incremental jumps 43 are longer because they include a vector component that opposes the unidirectional scans 41. In yet other embodiments, the area fill 40 can be divided into area zones. The area zones can have a shape that is one or more of a polygon, a rectangle, a square, a hexagon, a triangle, and irregular in shape.

One challenge with forming structures in metal are with stress and warpage. This can be particularly exacerbated by the formation of shapes having unsupported surfaces and structures. An unsupported surface is defined as a surface facing generally down or in the −Z direction. If an outer surface has a −Z component to its unit normal, it may need support.

FIG. 3 is a side view depicting a 3D article 3 having an unsupported surface 44 that overhangs the build plate 12. Without an underlying support, fabrication of layers above surface 44 will partially melt underlying layers and result in warpage. To eliminate the dross and warpage a plurality of removable support beams 46 are coupled between the build plate 12 and the unsupported surface 44. The support beams 46 preferably have a sufficient density to sink heat away from the unsupported surface 44 and provide enough mechanical support. The support beams 46 generally have a major axis along vertical axis Z.

The support beams 46 are individually formed by one or more sheets 48. The sheets 48 can be planar and/or curved. In a preferred embodiment, the sheets 48 are intersecting along the support beams 46. At the top of a support beam 46, the sheets 48 can define a pointed apex 50 at which they connect to the unsupported surface 44.

The support beams 46 are individually formed by a vertical sequence of contour scan patterns 34. Individually, the contour scan patterns 34 are formed from a plurality of contour scans 52. In a preferred embodiment, the contour scans 52 intersect. The contour scans 52 individually are one of a linear segment, a curved segment, and a closed curve. Also, the contour scans 52 are preferably single width contour scans 52 in which the contours are only scanned or traced once.

While FIG. 3 illustrates support beams 46 between an unsupported surface 44 and the build plate 12, other designs can be envisioned. For example, support beams 46 can be formed between an unsupported surface 44 and a portion of the 3D article 3. In some embodiments, support beams 46 can be formed between a generally upward facing surface and a generally downward facing surface. More generally, support beams 46 are formed between a support surface and the unsupported or downward facing surface 44. The support surface can be a surface of the build plate 12, a surface formed by metal that has been deposited upon the build plate 12, or a portion of the 3D article 3.

FIG. 3A is a side view of an embodiment of a support beam 46. The support beam 46 is formed from a crossed pair of elongate sheets 48. The illustrated elongate sheets 48 have a major axis along Z. Also, the elongate sheets 48 define a pointed apex 50 at which they connect to the unsupported surface 44. The pointed apex 50 minimizes a contact surface area and allows for ease of removal of the support beams 46 after fabrication of the 3D article 3. In some embodiments, the major axis of the support beam 46 and elongate sheets 48 can be along a direction that it oblique relative to the major axis Z. In other embodiments, the support beam 46 may have a major axis that defines a curve.

FIG. 3B illustrates an embodiment of a single slice or contour scan pattern 34 of the support beam 46. The support beam 46 is formed from a vertical sequence of the contour scan patterns 34. One contour scan pattern 34 is formed by a crossed pair of linear contour segments 52. Illustrated contour segment 52 is formed by a single linear scan of the beam 26. The result are vertical supports 46 that can be formed quickly and with a minimal use of the metal powder 20. However, to properly support the unsupported surface 44, a large number of support beams 46 may be needed.

FIG. 3C is another embodiment of a single contour scan pattern 34. The scan pattern includes three contour scans 52 including two crossed linear contour segments 52 (similar to FIG. 3B) plus a closed circular curve 52. The illustrated contour scans 52 can be single linear scans for a single scan width of melted or fused metal. Forming the contour scans 52 with a single scan width maximizes speed and efficiency of forming support beams 46.

Figure 4:
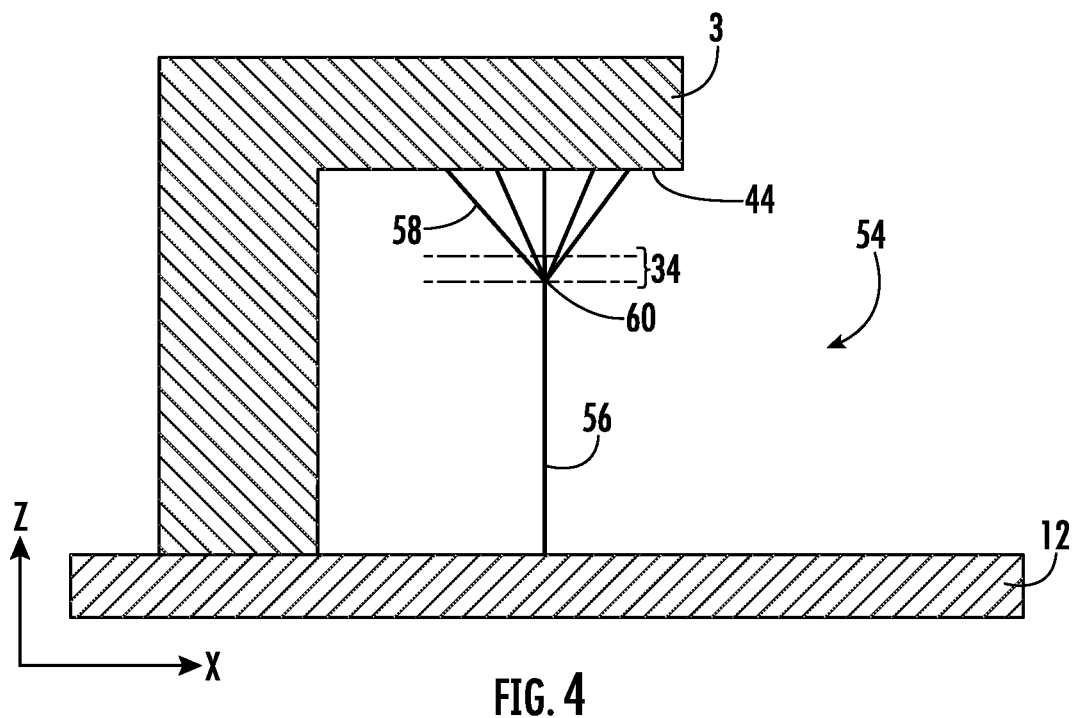
FIG. 4 is a side view depicting a 3D article and a metal-efficient support structure on a build plate.

FIG. 4 is a side view depicting the same 3D article 3 as FIG. 3 except with a more time and metal-efficient support structure 54. In the illustrated embodiment, the support structure 54 includes a lower support 56 from which a plurality of diverging upper supports 58 diverge and couple to the unsupported surface 44. Support structure 54 is more efficient than the support structure of FIG. 3 because it can be formed more quickly and with less metal. However, there is an issue at a convergence zone 60 at which the upper supports 58 diverge or fan out toward the unsupported surface 44. The convergence zone 60 can be defined as an approximate intersection of a downward projection of the branches 58. The convergence zone 60 is not exactly a point, but is a small volume at which an energy beam 26 would have to trace and retrace with numerous intersections in order to define the branches 58.

The support structure 54 extends between a support surface, illustrated as an upper surface of the build plate 12, and the unsupported (downward facing) surface 44. The support surface alternatively can be an upper surface of metal deposited on the build plate 12 or a portion of the 3D article 3.

Figure 4A:
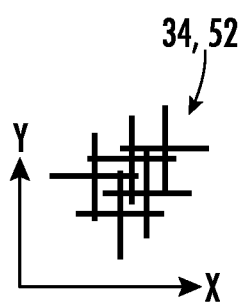
FIG. 4A is a view of a horizontal slice taken from FIG. 4.

FIG. 4A depicts a slice 34 taken proximate to the convergence zone 60. The contour segments 52 that form the upper supports 58 are very close together and overlap. This means that during fabrication, the beam 26 will be concentrating on a very small region of the metal powder 20 with overlapping scans. The result will be a "hot spot" at which the metal powder will melt and then overheat. The result will be thermal damage to the support 54 which may then not properly support the unsupported surface 44.

FIG. 5 depicts a solution to the hot spot thermal damage of FIG. 4. A support structure 62 includes a lower support or beam 64, a node body 66, and a plurality of branches 68. The node body 66 eliminates overheating in two ways: (1) The connections to the node body 66 can be spaced apart to reduce or eliminate overlapping scans. (2) The node body 66 can sink and conduct heat away from the branches 68 thus reducing peak temperatures in a given slice. Stated another way, the node body 66 (1) reduces a density of contour scans and (2) acts as a heat sink to transfer heat away from the convergence of the branches 68.

Comparing FIGS. 4 and 5, the node body 66 of FIG. 5 is roughly centered upon the convergence zone 60 of FIG. 4. Thus, the node body 66 replaces the convergence zone 60 that would require many overlapping contours 36 with a vertical sequence of area fill 40 slices. This eliminates the hot spots and provides a solid metal heat sink.

FIG. 5A depicts slice 34 taken from FIG. 5 proximate to a slice at which the branches 68 intersect the node body 66. In the illustrated embodiment, the crossed pairs of contour segments 52 are spaced apart from one another to prevent overheating of the slice 34. Below the branches 68, the node body 66 is formed by a vertical sequence of area fill 40 hatch patterns. The slices 34 of the node body 66 can also include contours 36 surrounding the area fills 40. An example of a contour 36 surrounding an area fill 40 has been described with respect to FIG. 2B.

FIG. 5B is an isometric drawing of an embodiment of the node body 66. The node body 66 has an upper surface 70 that is generally in facing relation toward the unsupported surface 44. Branches 68 couple to the upper surface 70. The node body 66 also has a converging lower end 72 that tapers in a downward (−Z) direction. The converging lower end 72 provides an effective coupling to the lower support beam 54 without an unsupported surface 44.

The support structure 62 extends between a support surface, illustrated as an upper surface of the build plate 12, and the unsupported (downward facing) surface 44. The support surface alternatively can be an upper surface of metal deposited on the build plate 12 or a portion of the 3D article 3.

Figure 6:
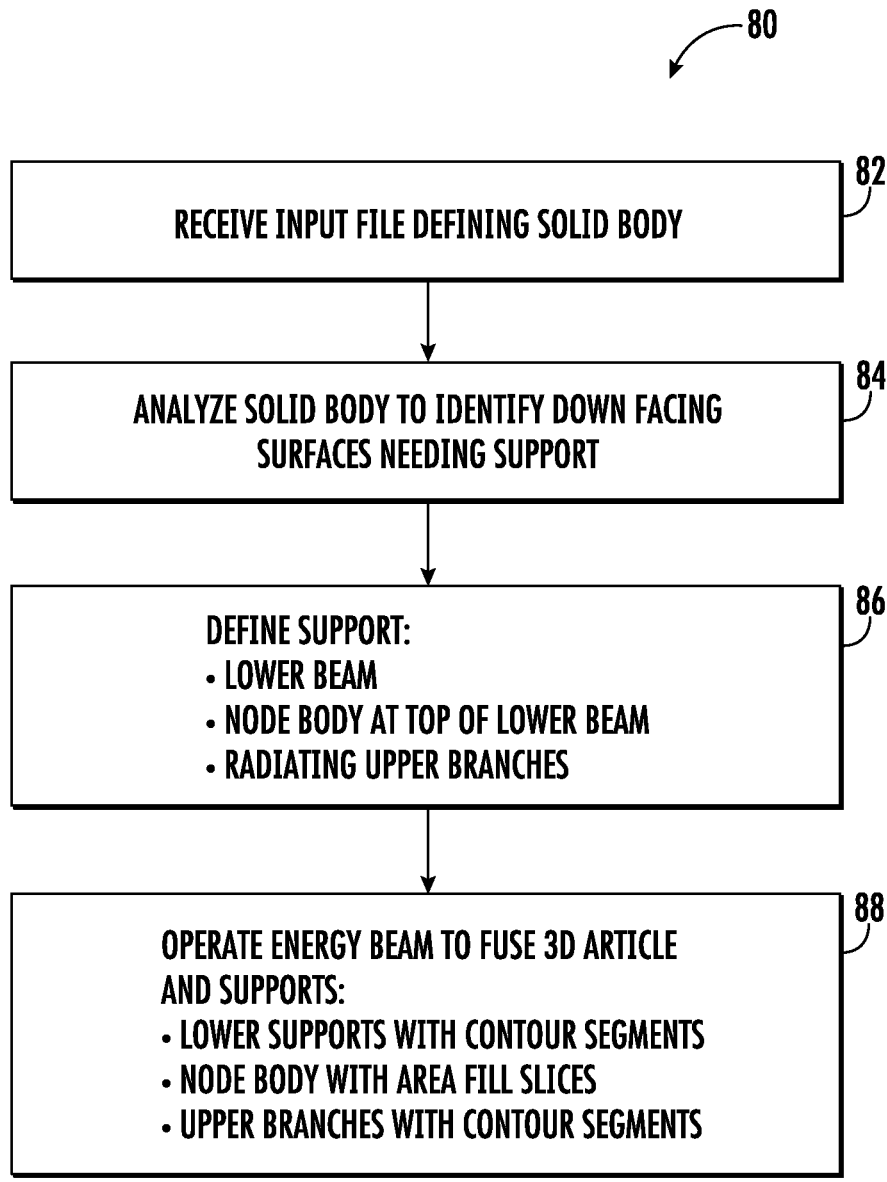
FIG. 6 is a flowchart depicting an embodiment of a method for manufacturing a 3D article with a support structure.

FIG. 6 is a flowchart depicting an embodiment of a method 80 for manufacturing a 3D article 3 with a support structure 62. Method 80 is performed by controller 28 which can include at least two different controller modules—one for defining a 3D model with supports and possibly another for controlling a fabrication process. Alternatively, controller 28 may be a single integrated controller.

According to 82 an input file is received that defines a solid body for the 3D article 3. According to 84, the input file is analyzed to identify a down-facing surface 44 requiring support. For some input files, multiple down facing surfaces 44 may be found. A down-facing surface 44 is partly defined by a unit normal vector from the surface having a −Z component.

According to 86, a support structure 62 is defined for supporting the down facing surface 44. The support structure includes a lower support or beam 64, a node body 66, and a plurality of at least three branches 68. In an illustrative embodiment, the lower support 64 includes one or more beams 64. The node body 66 is a solid body. The branches 68 have an elongate sheet structure such as that described with respect to FIG. 3A. The branches 68 can have a cross-section that is described with respect to FIG. 3B or 3C. The branches 68 intersect across the upper surface 70 of the node body 66. The node body 66 includes a converging lower end 72 that tapers downwardly until it couples to an upper end of the lower support or beam 64. The branches 68 also have a tapered or pointed end (shown as element 50 in FIG. 3A) for coupling to unsupported surface 44.

According to 88, the 3D printing system 2 is operated to fabricate the 3D article 3 with a support structure 62. In an illustrative embodiment, the lower support or beam 64 is fabricated by fusing a vertical sequence of contour scan patterns. The node body is fabricated by fusing a vertical sequence of slices that individually includes an area fill scan pattern (FIG. 2B, elements 40, 42). The upper branches are individually fabricated by fusing a vertical sequence of contour scan patterns.

The specific embodiments and applications thereof described above are for illustrative purposes only and do not preclude modifications and variations encompassed by the scope of the following claims.

What is claimed:

1. A system for manufacturing a three-dimensional (3D) article from metal powder comprising:
    a print engine; and
    a controller configured to:
        receive control signals defining a metallic structure including:
            a 3D article having a generally downward facing surface;
            a support structure including:
                a lower support beam having a lower end and an upper end, the lower end coupled to a support surface, the lower support beam including a crossed pair of elongate sheets;
                a node body with a solid interior coupled to the upper end of the lower support beam, the node body having a contiguous upper surface that is generally in facing relation with the generally downward facing surface, the node body is wider than the lower support beam and tapers in a downward direction to where it couples to the lower support beam;
                a plurality of at least three branches extending with a diverging geometry away from the upper surface of the node body and to the generally downward facing surface, the plurality of at least three branches define at least three spaced apart crossed pairs of contour segments where they intersect with the upper surface of the node body to prevent overheating; and
        operate the print engine to fabricate the metallic structure according to the control signals.

2. The system of claim 1 wherein the print engine includes a coater and a beam system, the controller is configured to operate the coater and the beam system to dispense and selectively fuse a sequence of layers of metal powder to concurrently form the 3D article and the support structure.

3. The system of claim 2 wherein the lower support beam is formed by a vertical sequence of contour scan patterns.

4. The system of claim 3 wherein the vertical sequence of contour scan patterns individually include at least two separate intersecting contour scans.

5. The system of claim 4 wherein the two separate intersecting contour scans are single contour scans.

6. The system of claim 4 wherein the at least two intersecting contour scans are individually one of a linear segment, a curved segment, and a closed curve.

7. The system of claim 4 wherein the at least two intersecting contour scans include a crossed pair of linear segments.

8. The system of claim 7 wherein the at least two intersecting contour scans include a generally circular segment that is intersected by the crossed pair of linear segments.

9. The system of claim 2 wherein the node body is formed by a vertical sequence of fused node slices, the fused node slices individually include hatched area fill slices.

10. The system of claim 2 wherein the plurality of branches are individually formed by a vertical sequence of contour scan patterns.

11. A system for manufacturing a three-dimensional (3D) article from metal powder comprising:
    a print engine including a coater and a beam system; and
    a controller configured to:
        receive control signals defining a metallic structure including:
            a 3D article having a generally downward facing surface;
            a support structure including:
                a lower support beam including at least a crossed pair of elongate sheets defined by a vertical sequence of contour scan patterns, the lower support beam having a lower end and an upper end, the lower end coupled to a support surface;
                a node body with a solid interior defined by a vertical sequence of area fill hatch patterns, the node body coupled to the upper end of the lower support beam, the node body having a contiguous and generally convex upper surface, the node body is wider than the lower support beam and tapers in a downward direction to where it couples to the lower support beam; and
                a plurality of at least three branches defined by a vertical sequence of contour scan patterns and extending with a diverging geometry away from the upper surface of the node body and to the generally downward facing surface, the plurality of at least three branches define at least three spaced apart crossed pairs of contour segments where they intersect with the upper surface of the node body to prevent overheating; and
        operate coater and beam system to dispense and selectively fuse a sequence of layers of metal powder to concurrently form the 3D article and the support structure.

12. A non-transient information storage system storing software instructions for a system, the system including a print engine and a controller, when executed by a processor the software instructions perform the following steps:
    receive control signals defining a metallic structure including:
        a 3D article having a generally downward facing surface;
        a support structure including:
        a lower support beam having a lower end and an upper end, the lower end coupled to a support surface, the lower support beam including a crossed pair of elongate sheets;
        a node body with a solid interior coupled to the upper end of the lower support beam, the node body having an upper surface that is generally in facing relation with the generally downward facing surface, the node body is wider than the lower support beam and tapers in a downward direction to where it couples to the lower support beam; and a plurality of at least three branches extending with a diverging geometry away from the upper surface of the node body and to the generally downward facing surface, the plurality of at least three branches define at least three spaced apart crossed pairs of contour segments where they intersect with the upper surface of the node body to prevent overheating; and operate the print engine to fabricate the metallic structure according to the control signals.

13. The non-transient information storage system according to claim 12 wherein the lower support beam is formed by a vertical sequence of contour scan patterns.

14. The non-transient information storage system according to claim 13 wherein the node body is at least partially formed by a vertical sequence of fused node slices, the fused node slices individually are hatched area fill slices.

\* \* \* \* \*